United States Patent [19]

Simmons

[11] 4,294,465
[45] Oct. 13, 1981

[54] OPERATOR'S STATION AND MOUNTING

[75] Inventor: Gerald P. Simmons, Washington, Ill.

[73] Assignee: Caterpillar Tractor Co., Peoria, Ill.

[21] Appl. No.: 157,332

[22] Filed: Jun. 9, 1980

Related U.S. Application Data

[63] Continuation of Ser. No. 859,361, Dec. 13, 1977, abandoned.

[51] Int. Cl.³ .................................. B62D 33/06
[52] U.S. Cl. ........................ 280/756; 180/89.1; 180/317; 296/190
[58] Field of Search .............. 180/317, 235, 236, 89.1; 280/756; 296/190, 200

[56] References Cited

U.S. PATENT DOCUMENTS

| | | | |
|---|---|---|---|
| 3,791,668 | 2/1974 | Adams | 280/756 |
| 3,866,781 | 2/1975 | Stedman et al. | 180/317 |
| 4,062,420 | 12/1977 | Stedman | 180/89.1 |
| 4,173,371 | 11/1979 | Kopas | 180/317 |

OTHER PUBLICATIONS

*Automobile Engineering,* Sep. 1976, vol. 84, No. 9, pp. 36-38, "Diesels Power Underground Mining Equipment".

Primary Examiner—Joseph F. Peters, Jr.
Assistant Examiner—Donn McGiehan
Attorney, Agent, or Firm—Wegner, Stellman, McCord, Wood & Dalton

[57] ABSTRACT

An earthworking machine having a frame, a pair of front wheels carried by a front portion of the frame, and a pair of rear wheels carried by a rear portion of the frame. An operator's station is mounted to the frame at one side thereof between the front wheel and rear wheel at that side. The operator's station includes an access opening opening toward one of the wheels. The operator station may include a wall portion having a recess receiving a portion of one of the wheels. A protective canopy is mounted to a portion of the frame and includes a portion overlying the operator's station to protect the operator from falling objects. Structure is provided within the operator's station for supporting the operator in a position facing across the machine. Speed control mechanism is provided at an inner portion of the operator's station for operation by the operator so facing inwardly toward the frame. The frame includes pedestal portions for mounting the operator's station and canopy structure. An improved foot pedal for controlling the engine's speed is provided.

7 Claims, 4 Drawing Figures

FIG_3_

OPERATOR'S STATION AND MOUNTING

This is a continuation of application Ser. No. 859,361 filed Dec. 13, 1977 now abandoned.

BACKGROUND OF THE INVENTION

1. Field of the Invention

This invention relates to earthworking machines and in particular to operator stations for use in such earthworking machines.

2. Description of the Prior Art

In U.S. Pat. No. 3,866,781 of Robert N. Stedman et al, which patent is owned by the assignee hereof, a mining machine is shown to have an articulated front and rear portion. The front portion is provided with an enclosure defining a sideways-oriented operator's station disposed partially between the front wheels of the machine. The frame of the front portion includes upwardly extending legs carrying a roof defining an opening selectively closed by a door.

SUMMARY OF THE INVENTION

The present invention comprehends an improved earthworking machine wherein the operator's station is disposed at one side of the machine between a front and rear wheel thereof. The operator's station may be secured to the frame as by threaded securing means.

The frame may be provided with upright supports carrying a canopy having a portion extending over the operator's station to protect the operator against falling objects.

The upright supports may further be utilized for securing of the operator's station to the frame.

The operator's station may include an access opening opening toward one of the wheels and in the illustrative embodiment, the access opening opens forwardly toward the front wheel with the operator station being spaced rearwardly of the wheel sufficiently to permit movement of the operator therebetween to and from the operator's station.

The various controls for controlling the engine and other mechanisms associated with the machine may be provided on an inner portion of the operator's station secured to the frame for ready access by the operator.

Means may be provided within the operator's station for supporting the operator so as to face inwardly toward the controls in a sideways fashion relative to the fore-and-aft travel of the machine.

Connecting means may be extended from the controls in the operator's station across the machine to the operating mechanisms of the machine.

In the illustrated embodiment, a portion of the connecting means is extended through portions of the frame.

An improved foot pedal is provided with the operator's station for controlling the speed of the engine of the vehicle.

The foot pedal structure includes a control member which is mounted to pivot about a first axis. The foot pedal is mounted to the control member to pivot about a second axis parallel to the first axis. A stop is provided for limiting the pivotal movement of the foot pedal about the second axis.

The foot pedal may include retaining means for retaining an operator's foot against movement in one direction along the pedal with the stop and the retaining means being spaced oppositely from the second axis.

The improved operator's station and control means of the present invention are extremely simple and economical of construction while yet providing highly improved functioning in such earthworking machines and vehicles.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
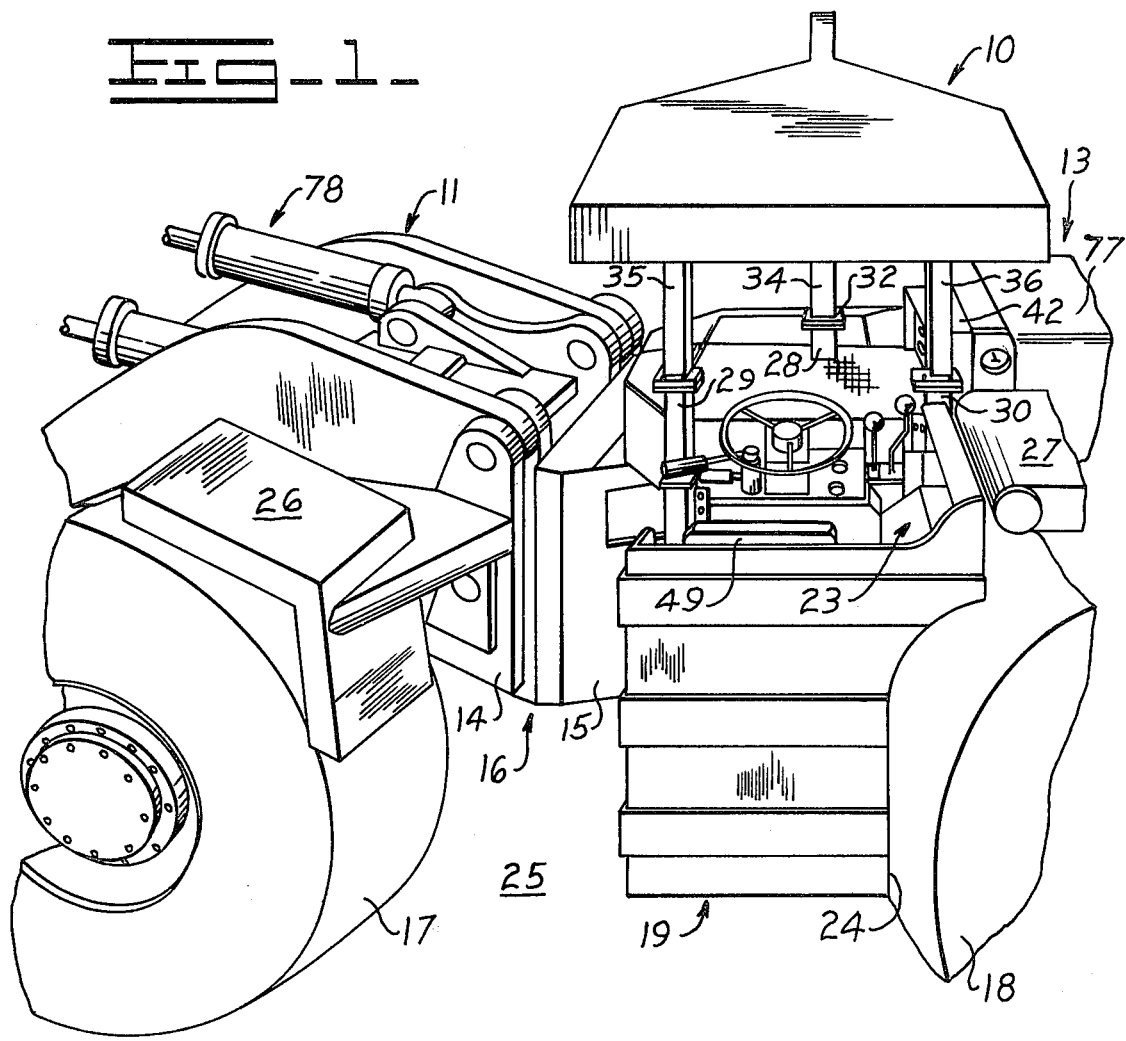
FIG. 1 is a fragmentary perspective view of an earthworking machine having an operator's station and control means embodying the invention.

In the exemplary embodiment of the invention as disclosed in the drawing, an earthworking machine generally designated 10 is shown to comprise a machine generally of the type shown in the above-discussed Stedman et al U.S. Pat. No. 3,866,781 wherein a front portion 11 is articulated by suitable articulation means 12 to a rear portion 13. Front portion 11 defines a front frame portion 14 and rear portion 13 defines a rear frame portion 15 cooperatively defining the frame 16 of the machine. Front frame portion 14 carries a pair of front wheels 17 at its opposite sides, and rear frame portion 15 carries a pair of rear wheels 18 at its opposite sides.

Figure 3:
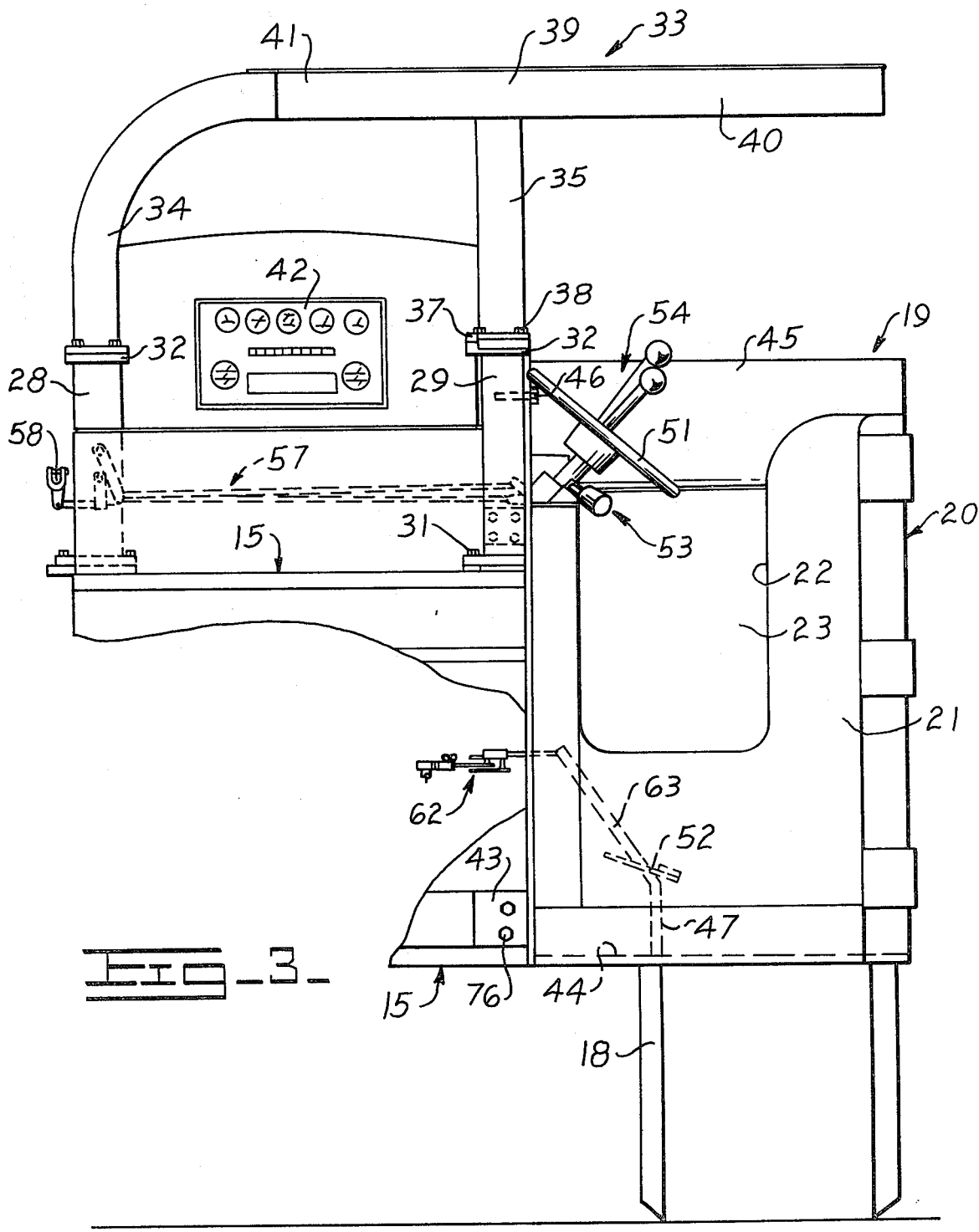
FIG. 3 is a fragmentary vertical section taken substantially along the line 3—3 of FIG. 2.

As shown in FIG. 1, disposed between the left front wheel 17 and left rear wheel 18 is an operator's station generally designated 19. As shown in FIG. 3, operator's station 19 is mounted to the left side of frame 15 to extend outwardly therefrom to between the left vehicle wheels.

Figure 2:
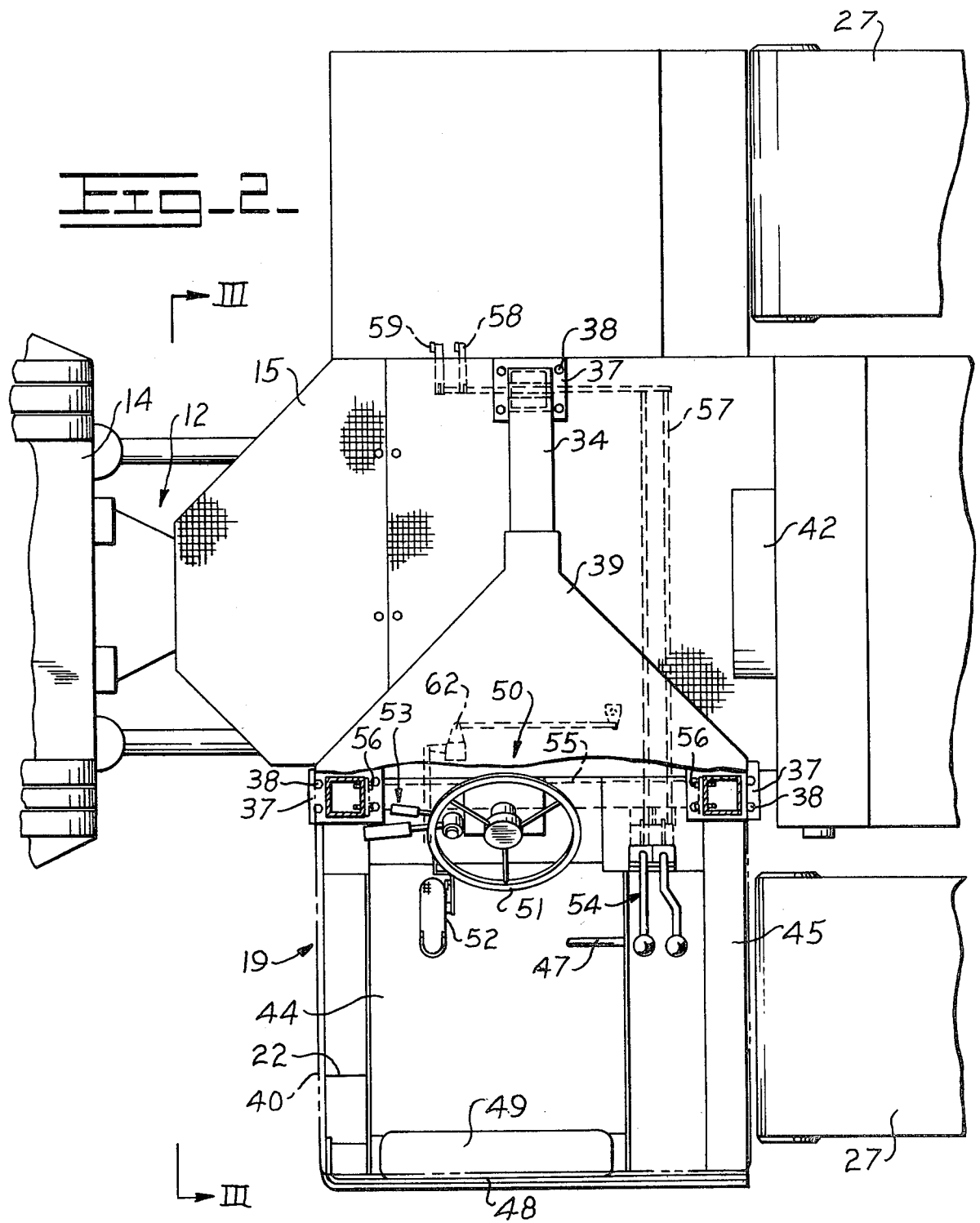
FIG. 2 is a top plan view thereof.

The operator's station is defined by wall means generally designated 20 including a front wall 21 defining an upwardly opening access opening 22. As shown in FIGS. 2 and 3, the rear wall 23 of the wall means 20 defines a recess 24 receiving a portion of the rear wheel 18 so that, in effect, the operator's station partly overlies the rear wheel 18 so as to be spaced rearwardly from the forward portion of the machine and more specifically, rearwardly of the front wheel 17 so as to define a passage space 25 permitting the operator to move to and from the access opening 22.

As shown in FIG. 1, suitable fenders 26 may be provided on the front machine portion 11 and suitable fenders 27 may be provided on the rear portion 13 of the machine to protect the operator in the operator's station from material being thrown by the wheels in the operation of the machine.

A plurality of pedestals may be provided on frame 15 including a right pedestal 28, a forward left pedestal 29, and a rear left pedestal 30. As shown in FIG. 3, the pedestals may be secured to the frame as by bolts 31. As further shown in FIGS. 1 and 3, the upper end of the pedestals define flange connector portions 32. A falling object protective device generally designated 33 is mounted to the pedestals by means of three leg portions 34, 35 and 36. The leg portions may be provided with lowermost flanges 37 secured to the flanges 32 of the pedestals by suitable bolts 38.

At their upper ends, the legs 34, 35 and 36 support a cantilevered canopy 39 which, as shown in FIG. 3, includes a portion 40 overlying the operator's station 19 for protecting an operator in the upwardly open operator's station (see FIGS. 1 and 3) against falling objects. The forward portion 41 of the canopy overlies an instrument panel 42 of the machine and, thus, serves to protect the instrument panel against falling objects.

Operator's station 19 is secured to the rear frame 15 by suitable bolts 76 extending through a bracket portion 43 of the operator's station adjacent a bottom wall portion 44 thereof. Rear wall 23 of the operator's station is provided with a beam 45 which is secured to pedestal 30 by suitable bolts 46. Bottom wall 44 is provided with an upstanding footrest 47 and the outer sidewall 48 of the operator's station wall means is provided with a backrest pad 49 against which the operator may lean in operating the machine.

As best seen in FIG. 2, the inner portion of the operator's station (i.e. the portion adjacent the frame 15) is provided with controls generally designated 50 for controlling the operation of the machine. More specifically, the controls may include a steering wheel 51, a governor mechanism 52, throttle and transmission control levers 53, and lift and tilt control levers 54. A support beam 55 may be provided for mounting the controls in the operator's station with the support beam being secured between the pedestals 28 and 29 by suitable bolts 56.

Figure 4:
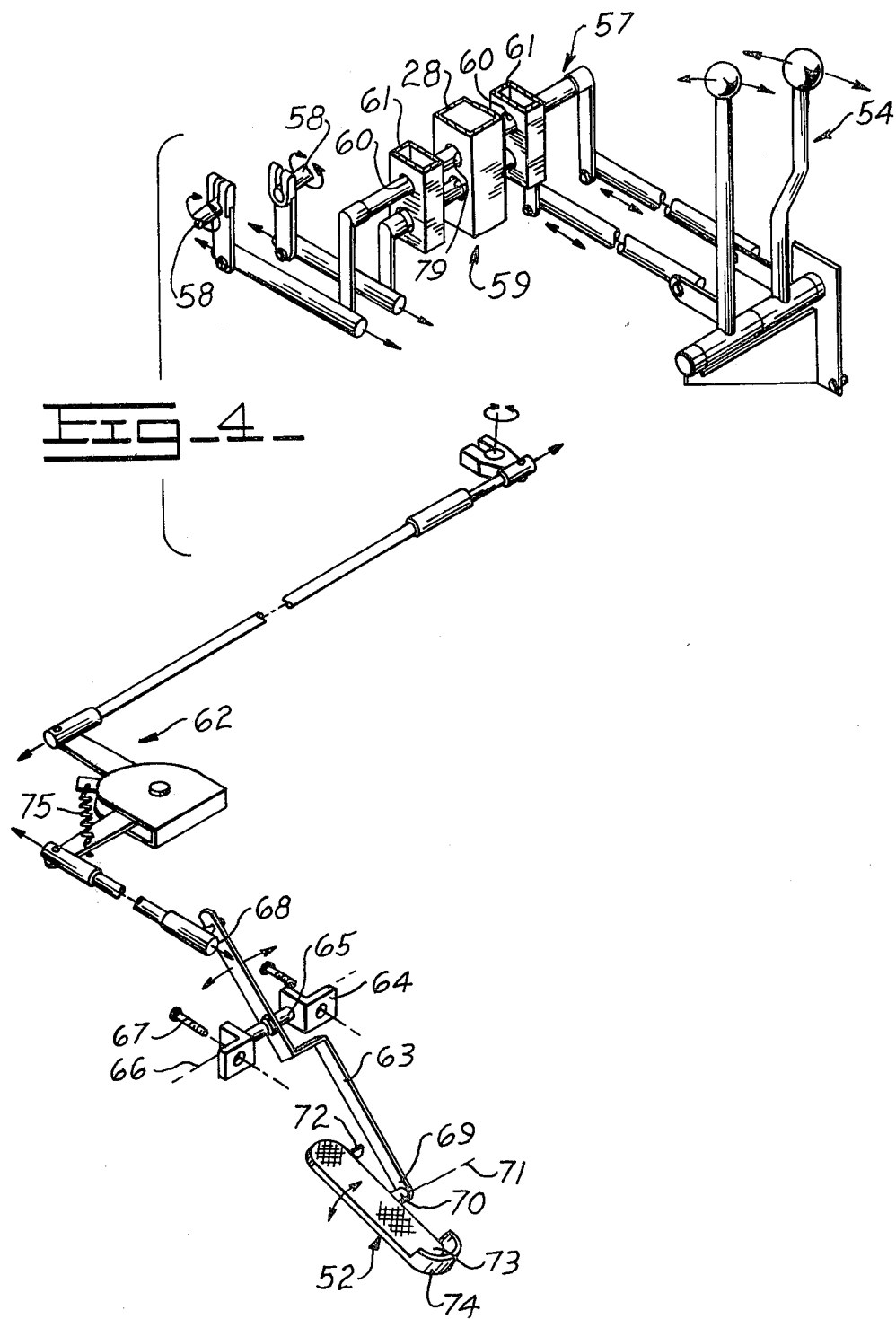
FIG. 4 is a fragmentary broken perspective view of a portion of a control connecting means.

Reference being made more specifically to FIG. 4, the tilt and lift levers are connected through a connecting means generally designated 57 to operating control shafts 58. The connecting means may include rod portions 59 extending through bearings 60 in supports 61 of the machine on opposite sides of pedestal 28. As shown, rod portions 59 extend through suitable clearance holes 79 in pedestal 28. As seen in FIG. 3, the connecting means 57 extends transversely across the machine from the arms 54 to permit operation of the hydraulic operators of the tilt and lift mechanisms in the normal manner with minimum modification of the standard machine design.

Similarly, connecting means 62 may be associated with governor foot pedal 52 for providing similar remote operation by operator movement of the foot pedal. As discussed briefly above, the connection means 62 may include a control member 63 mounted to suitable supports 64 by means of a pivot 65 for pivoting of the control member about a first axis 66. The support 64 may be secured to frame 15 of the vehicle by suitable threaded means, such as bolts 67. One end 68 of the control member is corrected to the connecting means 62 and the opposite end 69 of the control member is provided with pivot means 70 for pivotally mounting the foot pedal 52 for pivoting about a second pivot axis 71 spaced from and parallel to pivot axis 66 of the control member.

Foot pedal 52 is provided with a stop 72 disposed to engage the control member 63 to maintain the foot pedal generally horizontal when the control member 63 is disposed in low idle position wherein control member end 69 is in its uppermost position. A retaining shoulder 74 may be provided on the foot pedal for maintaining the user's foot against movement along the foot pedal away from stop 72. Suitable spring means 75 may be provided for biasing the control member in a counterclockwise direction so as to dispose the foot pedal uppermost in said low idle position.

Thus, in operation, when the user depresses the foot pedal as by placing his foot on the foot pedal and urging the foot pedal downwardly so as to carry with it the pivot 70, the control member 63 is pivoted in a clockwise direction about axis 66, as seen in FIG. 4. As the foot pedal is freely pivotable, the user's foot may cause a swinging of the foot pedal in a clockwise direction, as seen in FIG. 4, to bring the stop 72 against the underside of the control lever portion 69 to assure that the downward movement of the user's foot effectively is translated into movement of the connecting means 62, as discussed above.

Thus, the earthworking machine 10 comprises a low profile earthworking machine adapted for use in low height applications, such as in mining. The provision of the operator's station at the side of the machine with the operator facing inwardly toward the center of the machine permits facilitated control of the machine operation while effectively maintaining the desired low overall height of the machine. By mounting the operator's station on the side of the frame of the rear portion of the vehicle, the operator station is disposed closely to the subjacent terrain, as shown in FIG. 3, so that the overhanging, or cantilevered portion 40 of the canopy 39 is disposed at minimum height relative to the subjacent terrain while suitably covering the operator in the upwardly open operator's station (see FIGS. 1 and 3) and providing the desired protection against falling objects.

The canopy may further be extended to protect portions of the machine overlying the frame, such as the instrumentation 42 seen in FIG. 3. The operator's station may be provided at the front end of the rear portion of the machine with the engine 77 thereof extending rearwardly therefrom. Thus, the operator is centrally located relative to the tilt and lift means, generally designated 78 on the front portion of the machine and the engine 77 on the rear portion of the machine so as to provide optimum control in the operation of the machine in both forward and rearward movement operations as well as in the control of the earthworking mechanism operated by the tilt and lift means 78. Such mechanisms are well known to those skilled in the art and the specific arrangement thereof forms no part of this invention. However, for a more complete disclosure of such lift and tilt mechanisms and engine mounting arrangements, reference may be had to the above discussed Stedman et al U.S. Pat. No. 3,866,781.

The foregoing disclosure of specific embodiments is illustrative of the broad inventive concepts comprehended by the invention.

The embodiments of the invention in which an exclusive property or priviledge is claimed are defined as follows:

1. In an earthworking machine having frame means defining opposite side portions, a pair of front wheels carried by a front portion of said frame means, a pair of rear wheels carried by a rear portion of said frame means, said wheels being disposed outwardly of said frame means side portions, and mechanism for operating the machine, the improvement comprising:

wall means defining an upwardly open operator's station;

means for securing said wall means to one of said frame side portions to dispose said operator's station outwardly thereof between a front wheel and rear wheel;

a protective canopy mounted to said frame inwardly of said operator's station and including a cantilevered portion overlying and being unsupported by the operator's station outwardly of the frame for protecting the operator in said station from injury by falling objects and permitting substantially unobstructed viewing forwardly, rearwardly and outwardly from said station, said frame being provided with connector portions on the opposite side portions thereof, said canopy being provided with depending leg portions arranged to be connected to said connecting portions; and bolt means for removably securing said leg portions to said connector portions to removably support the canopy at each of the opposite sides of the frame, the canopy being supported to the frame side portion opposite that to which the operator's station wall means is secured by only one of said leg portions.

2. The earthworking machine structure of claim 1 wherein said connector portions comprise pedestal means securely bolted to the frame.

3. The earthworking machine structure of claim 1 wherein said wall means defines a recess receiving a portion of one of said wheels.

4. In an earthworking machine having frame means defining side portions, a pair of front wheels carried by a front portion of said frame means, a pair of rear wheels carried by a rear portion of said frame means, said wheels being disposed outwardly of said frame means side portions, and mechanism for operating the machine, the improvement comprising:

wall means defining an upwardly open operator's station;

means for securing said wall means to one of said frame side portions to dispose said operator's station outwardly thereof between a front wheel and rear wheel;

a protective canopy mounted to said frame inwardly of said operator's station and including a cantilevered portion overlying and being unsupported by the operator's station outwardly of the frame for protecting the operator in said station from injury by falling objects;

means within said operator's station for supporting an operator in a position to face across the machine under said cantilevered portion of the canopy, said cantilevered portion of the canopy permitting unobstructed viewing by said operator forwardly, rearwardly, and outwardly from said operator's station, said frame being provided with connector portions on the opposite side portions thereof, said canopy being provided with depending leg portions arranged to be connected to said connecting portions; and bolt means for removably securing said leg portions to said connector portions to removably support the canopy at each of the opposite sides of the frame, the canopy being supported to the frame side portion opposite that to which the operator's station wall means is secured by only one of said leg portions aligned with the transverse center of the operator's station for permitting substantially unobstructed further viewing by the operator forwardly and rearwardly across said frame.

5. The earthworking machine structure of claim 4 wherein said connector means comprises upstanding pedestal means on the frame and said mechanism includes manual operating means carried by said pedestal means to be disposed within said operator's station inwardly of said operator supporting means.

6. The earthworking machine structure of claim 4 wherein said connector means comprises upstanding pedestal means on the frame and said mechanism includes manual operating means carried by said pedestal means to be disposed within said operator's station inwardly of said operator supporting means and connecting means extending from the manual operating means through a portion of said pedestal means.

7. The earthworking machine structure of claim 4 wherein said connector means comprises upstanding pedestal means on the frame and said mechanism includes manual operating means carried by said pedestal means to be disposed within said operator's station inwardly of said operator supporting means and connecting means extending transversely across the machine from said manual operating means.

* * * * *